United States Patent [19]

Defaux

[11] Patent Number: 4,932,651
[45] Date of Patent: Jun. 12, 1990

[54] BICYCLE TRAINING DEVICE

[76] Inventor: Georges Defaux, A.A. 55323, Bogota, Colombia

[21] Appl. No.: 416,693

[22] Filed: Oct. 3, 1989

[51] Int. Cl.$^5$ .............................................. A63B 69/16
[52] U.S. Cl. .......................................... 272/73; 434/61
[58] Field of Search ............... 272/73, 93, DIG. 4; 434/61, 247

[56] References Cited

U.S. PATENT DOCUMENTS

| 589,705 | 9/1897 | Dwyer | 272/73 |
| 4,082,265 | 4/1978 | Berkes | 272/73 |
| 4,415,152 | 11/1983 | Smith | 272/73 |
| 4,441,705 | 4/1984 | Brown | 272/73 |
| 4,580,983 | 4/1986 | Cassini et al. | 272/73 |
| 4,750,737 | 6/1988 | Smith | 272/73 |
| 4,826,150 | 5/1989 | Minoura | 272/73 |

Primary Examiner—Stephen R. Crow
Attorney, Agent, or Firm—Browdy and Neimark

[57] ABSTRACT

An apparatus that simulates bicycle riding is disclosed wherein a bicycle is mounted on a rectangular structural base having two freely rotating rollers on which leading and trailing wheels of the bicycle lie. The bicycle is supported and held by a rigid rod enterable in a vertical tube disposed on the bicycle frame and the rod is mounted on a laterally sliding support in the base. Stop rollers are provided at each end of the leading roller to prevent the leading wheel of the bicycle from moving off of the roller surface.

8 Claims, 6 Drawing Sheets

BICYCLE TRAINING DEVICE

FIELD OF THE INVENTION

The present invention relates to exercise equipment and, more particularly, a device for using a conventional bicycle as a stationary exercise device.

BACKGROUND OF THE INVENTION

Mechanical apparatus simulating bicycles and enabling the user to get physical exercise indoors is known. However, such apparatus is designed exclusively for static performance because such exercycle devices only provide the action of pedals which the user moves, as in the case of a bicycle. The feelings derived from these devices is just the effort of pedaling, but the advantages of practicing outdoor bicycle riding is restrained, and the exercise provided by such simulated riding becomes monotonous. Under these conditions, the continued use of such devices tends to be less and less until the user ceases to ride them anymore.

U.S. Pat. No. 4,082,265 discloses an apparatus for supporting a bicycle in an upright position on a roller-type training device; however, the vertically upstanding elongate legs which hold the bicycle via a substantially fixed triangular setting allow only a controlled amount of leaning action of the bicycle as it is ridden, and therefore only limited simulation of outdoor riding conditions.

U.S. Pat. No. 4,580,983 discloses a large complicated device for holding a bicycle stationary. The device comprises a floor resting structure, two supporting rollers, one for each wheel of the bicycle, kinematically connected to each other and to a fan operative to blow a flow of air against the front portion of the bicycle. However, the means associated with the device for maintaining the bicycle in the upright position allow only limited deviations from the vertical, and the bicycle is at risk of running off of the roller to the harm of the rider.

U.S. Pat. No. 4,415,152 discloses the use of a large complicated device for mounting a bicycle and restraining it for rider exercise and training. However, the rear wheel of the bicycle on this device is disposed below the level of the front wheel, cradled in a two roller support bed, and this arrangement forbids rear wheel simulation of outdoor riding conditions.

SUMMARY

Therefore, an object of the present invention is to overcome deficiencies in the prior art such as indicated above.

Another object of the invention is to provide an apparatus for practicing bicycle riding indoors which offers the user the feeling of riding outdoors, much like when the user is on a real bicycle which has lateral movement, that is imposed by the user upon the rotation of the handlebars, when riding on the road.

An additional objective of the invention is to provide an apparatus for bicycle riding that has the advantages of universal use, due to its capacity to allow the two main parts thereof to be demounted to obtain a conventional bike that can also be used or ridden outdoors.

An objective further still is to provide a device with a bicycle having the advantages of adjustable handlebars and saddle that permit a tall person, (i.e. 6'2") or a small person (i.e. 5 or 6 years old) to ride, and allows the riding position of the user to always be in the most optimum position, independent of height. Thus, the apparatus can be utilized by all members of a family.

Another objective of the invention is to provide a construction that allows a range of variations of efforts on the pedal, thereby offering the rider a variety of sensations, such as going up or down a hill. This allows changes in the type of exercise and produces beneficial effects for the rider in the areas of physical health, muscle development and strengthening of the heart.

Other objectives, advantages and the nature of the invention will become apparent from the following detailed description, which is given as exemplary and non-limiting embodiments of the invention without the intent of limiting the spirit and scope of the same.

In general, the present invention relates to a novel sports apparatus which allows bicycle riding at a family level with a feeling of being outdoors because of the freedom of the bicycle wheels to move laterally.

The apparatus comprises a universal bicycle mounted in a rectangular structural base having two free rotating rollers on which leading and trailing wheels of the bicycle lie. The bicycle is supported and held by a rigid rod that enters into a tube disposed on the bicycle frame, said rod being mounted in a vertical tube soldered to a lateral sliding support in the base. Stop roller means are provided at each end of the leading roller to prevent the leading wheel of the bicycle from going off of the roller surface.

The apparatus of the invention permits anyone to practice riding (even a first time rider) with no risk of falling and its two main parts are demountable in an easy and practical manner.

A more detailed description of the invention apparatus is given hereinafter with reference to the drawings, wherein:

DETAILED DESCRIPTION OF THE INVENTION

Figure 1:
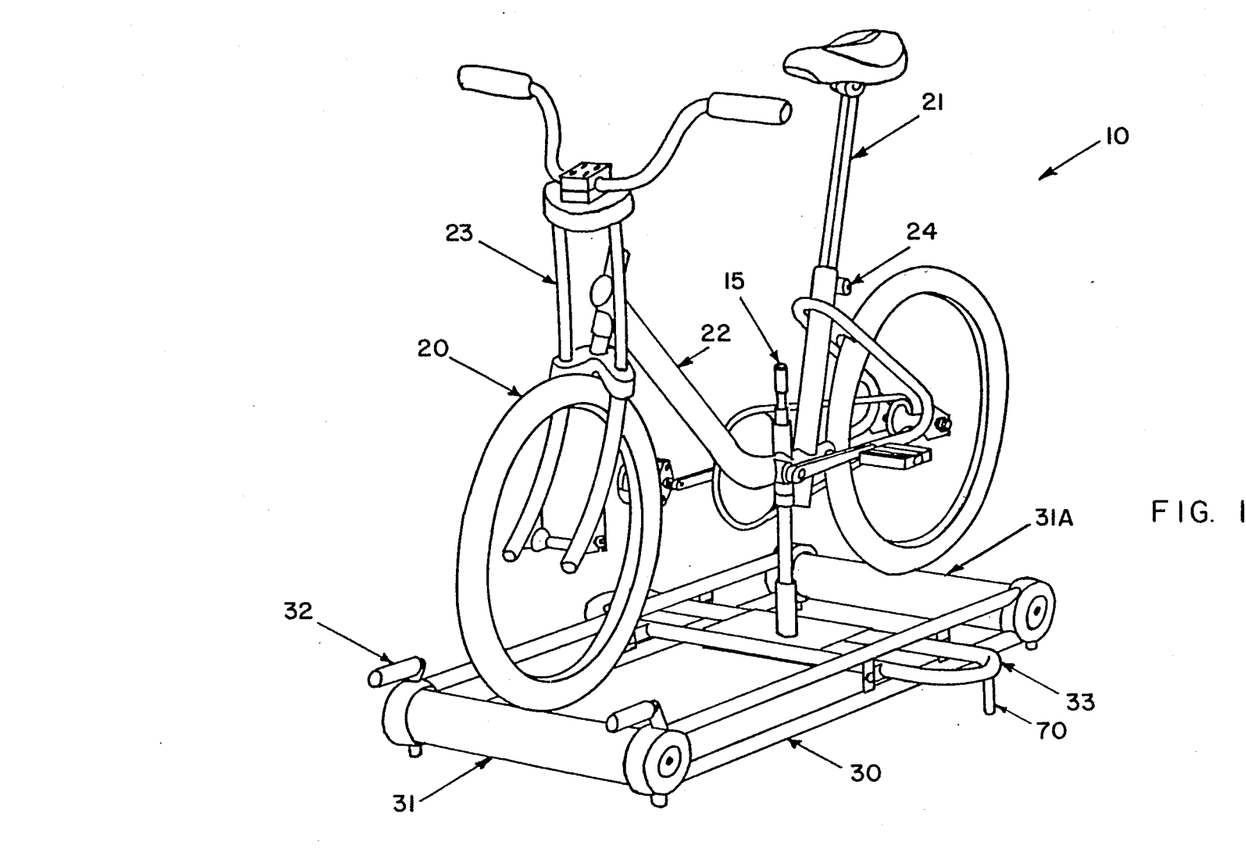
FIG. 1 is a perspective view of the apparatus of the present invention.

FIG. 1 shows a perspective view of the apparatus, generally referred to by numeral 10. The apparatus consists basically of two main parts: a bicycle 20 and a base 30. The bicycle 20 is universal bicycle modified in order to provide some of the characteristics that impart the feeling of being outdoors while riding indoors.

Frame 22 of the bicycle is generally made of cold rolled steel tubing and is of a structural strength adequate to accommodate a large or small rider without danger. On the bottom part of frame 22, next to the pedal location, there is provided a vertically positioned round tube 50, (see FIG. 9) which serves to securely mount the bicycle 20 on base 30, by passing within said tube 50, a rod 15 located and vertically mounted over a support in the base. As seen from FIGS. 1 and 9, the bicycle 20 is simply mounted on the base without the need of any type of fastener to hold it in place; that is, the bicycle is simply driven in over the rod 15. This arrangement allows mounting or dismounting of the bicycle onto or off of the base in a very practical and simple manner.

Another novel feature of bicycle 20 is the height adjustment feature of the saddle. The tube 21 which supports the saddle of the bicycle is a square cross section tube having enough length to achieve an adjustment range such that a tall person (i.e. 6'2") or a small one (i.e. a 5 or 6 year old), can ride comfortably. Tube 21 is introduced into a vertical and backward inclined round tube of frame 22 of bicycle 20. Towards the top of said rear tube of frame 22, close to its end, there is provided a novel locking device 2 to hold saddle supporting tube 21 in place and block it. The design of the locking device (see FIGS. 3, 4, 5 and 6) provides a lock-by-clamping action, and comprises an external round tube 26, having a V-cut located in the middle of the length of tube 26. In the inside of said tube 26, there are lodged two solid steel cylinders 28, 29. Each of said cylinders shows a 45°-cut at one of its ends, such that when placing both cylinders with the cut ends face to face, the cuts form a V-groove, which is coupled with the saddle supporting tube 21 (see FIG. 6), to provide a tightening force over the tube. Each of said cylinders have a threaded through-hole; the hole, in cylinder 29 having a ⅜×24 thread and the hole in cylinder 27 having a 5/16×18 thread.

Figure 6:
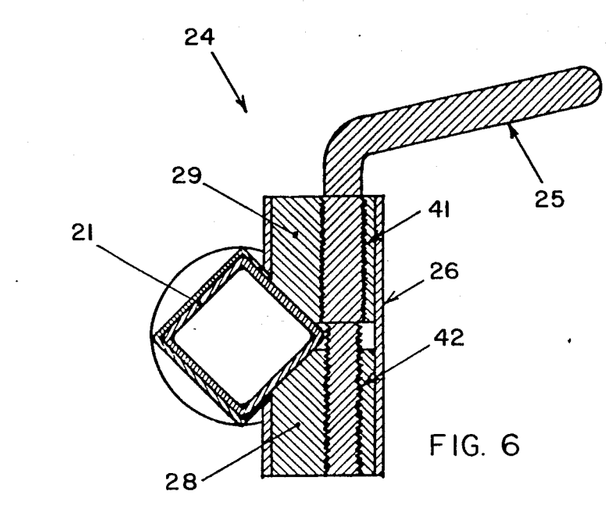
FIG. 6 is a cross sectional view taken along line A–A' of the device of FIG. 4.
Figure 7:
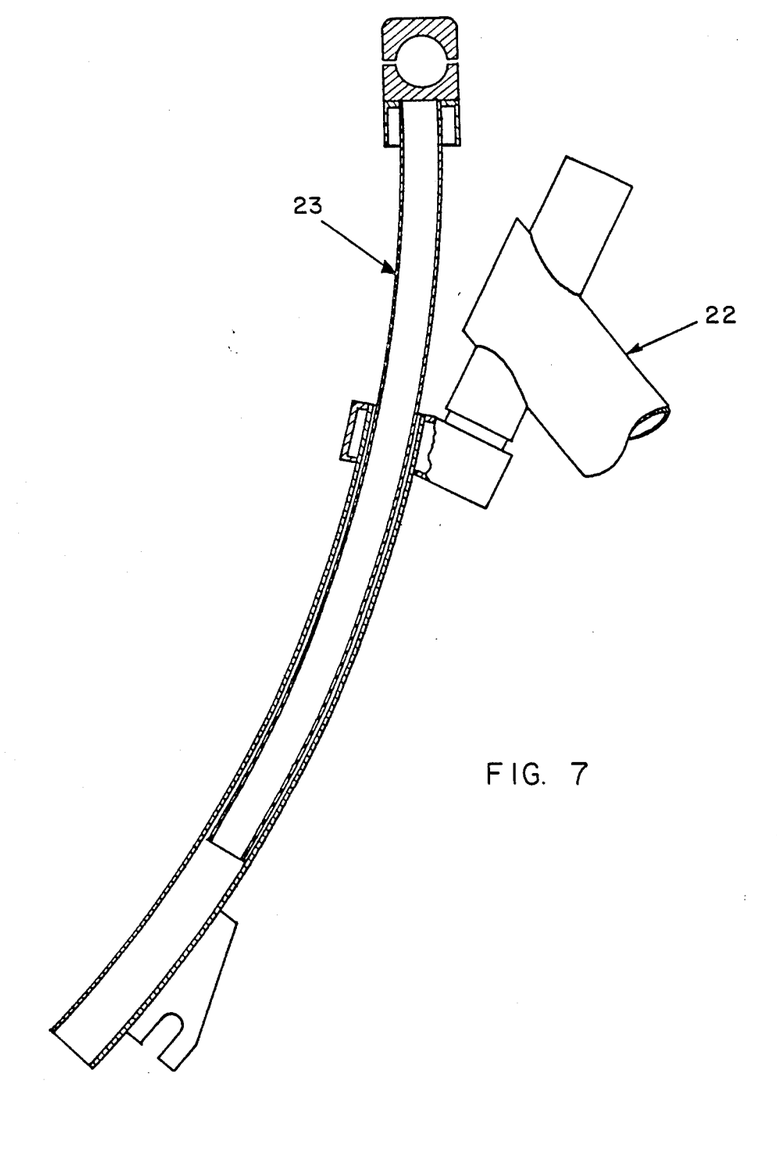
FIG. 7 is a cross sectional view showing the adjustable telescoping design of the handlebars of the bicycle.

In the arrangement of said cylinders, as it can be seen in FIG. 6, both through-holes are aligned such that, through them, and beginning with the outer end of cylinder 29, a stud 25, having one of its ends bent to form a handle, is introduced. The stud 25 is threaded with two different threads. one thread 42, which starts at the opposite end of the handle in stud 25 and ends half way the length of stud 25, is a 5/16×18 thread which mates with the thread on cylinder 28, and the other thread 41, which starts at the end of thread 42 and terminates close to the point where the handle starts, is a ⅜×24 thread, which mates with that of cylinder 29. The net effect of these two threads is that the pitch for each cylinder will differ, even if the movement has the same direction, thereby causing cylinder 28 to close up to cylinder 29 by a 0.35 mm per turn impressed on the handle.

Another modification of the bicycle of the invention relates to the handle bars, and in particular, the structure supporting the handlebars. The front zone of frame 22 of the bicycle, called the fork element, on which the bottom end of the leading wheel of the bicycle is held, is made out of two parallel and curved circle section tubes, held together on their top ends by a triangular shaped support which allows access to the top open ends of said tubes. Two curved circle section tubes 23, having the same radius as the tubes of said fork are introduced through said top open ends. Tubes 23 have enough length to allow obtaining handlebars height adjustment comparable to that obtained for the saddle height adjustment.

In this manner both the height adjustments of the saddle and handlebars allow a person riding on the bicycle, independent of size, to be in the best and most convenient riding position. As it can be appreciated from FIG. 1, the vertical backward inclined direction in which the saddle height is adjusted and the circular or forward curved direction in which the handlebars height is adjusted, makes it such that the higher the adjustment, the greater the lineal distance between the saddle and the handlebars, thus maintaining similar triangle arrangements having vertexes defined by the locations of the saddle, handlebars and pedals of the bicycle, thereby achieving riding positions most adequate for each person size and at the same time making the gravity center of the assembly, including that of the user, always follow a vertical line location to avoid horizontal displacement.

The foregoing features make the bicycle 20 of the present invention unique and this together with the structural base 30, which will be described hereafter, constitutes the novel assemblage.

Figure 2:
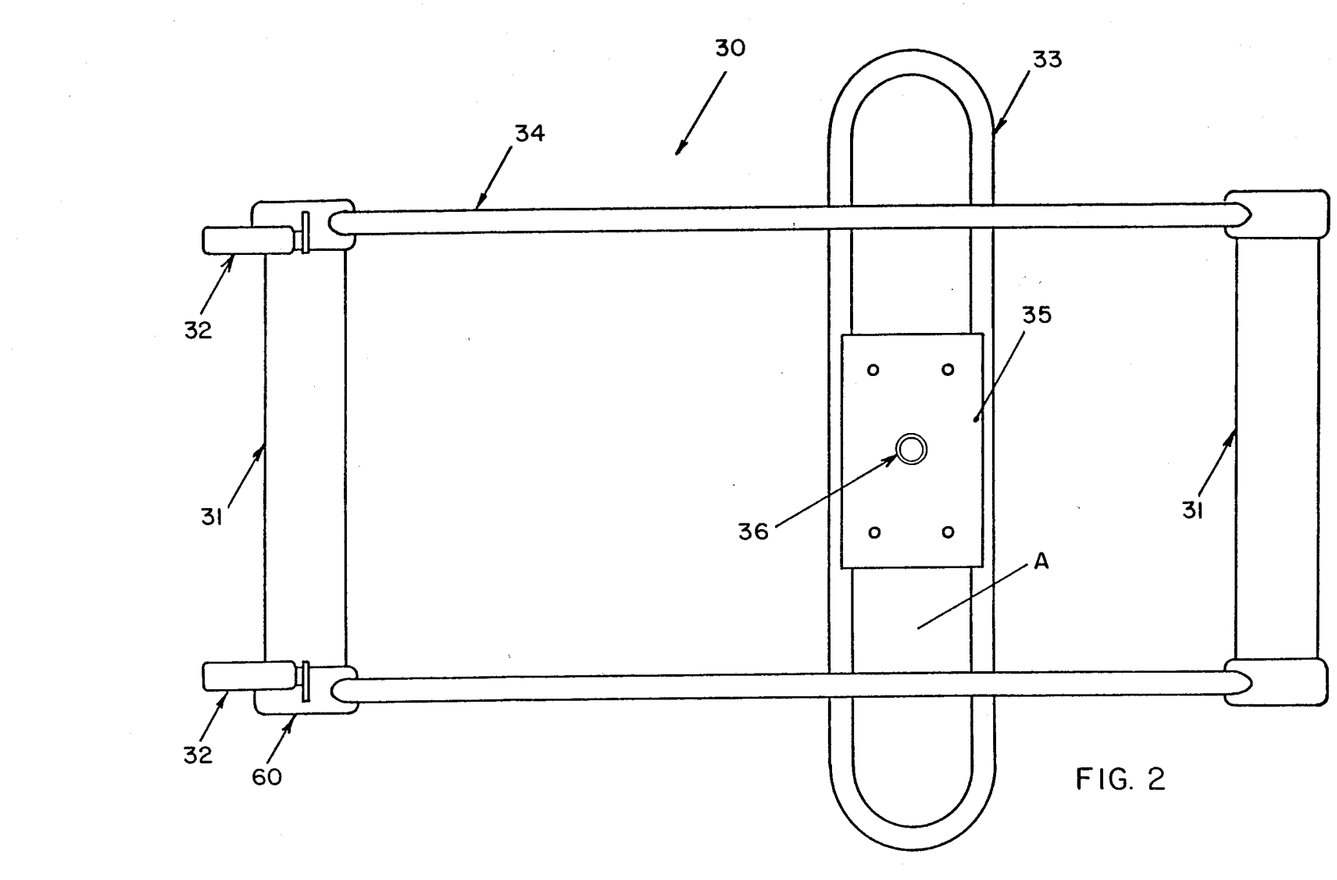
FIG. 2 is a top view of the base portion of the apparatus shown in FIG. 1.
Figure 3:
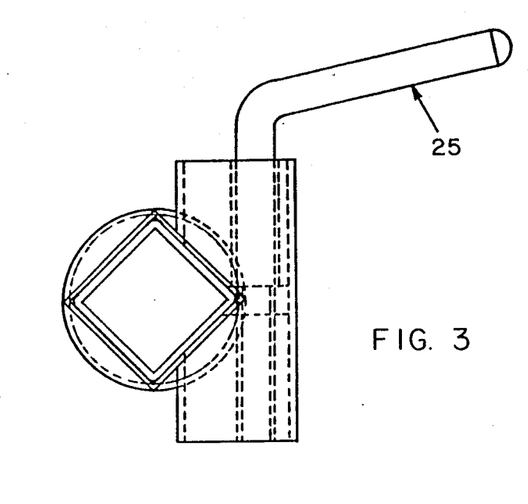
FIG. 3 is a top view of the novel locking device which holds the saddle supporting tube of the bicycle in place.
Figure 4:
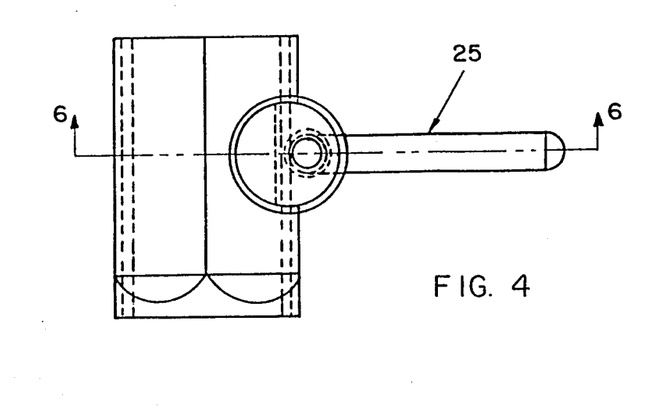
FIG. 4 is a side view of the locking device of FIG. 3.
Figure 5:
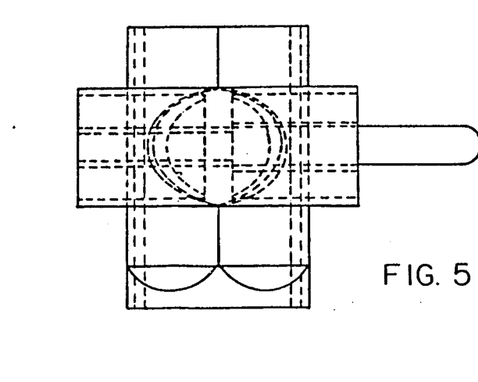
FIG. 5 is a rear view of the locking device of FIG. 3.

Structural base 30 as shown in FIGS. 1 and 2, basically has a rectangular shape, thereby providing stability against overturning. Said base comprises two free rotating rollers 31, 31A, (a leading roller 31, and a trailing roller 31A), which are the minor opposing sides of the rectangular shaped base. Said rollers are mounted over ball bearings which in turn are located over a central axle (see FIG. 8). Lying upon rollers 31 and 31A respectively are the leading and trailing wheels of the bicycle. These rollers are mechanically connected through two belts 39 located in tubes 38, which form the major sides of the rectangular shaped base. Said belts pass around four pulleys located at the ends of said rollers. Two tubes 38, on each side, vertically in line one over the other are separated by a sufficient distance in order to allow good performance of the pulleys. The ends of said tubes have four covers 60, one at each end, of rollers 31 and 31A, and protects the belts passing therearound (see FIG. 8).

Figure 8:
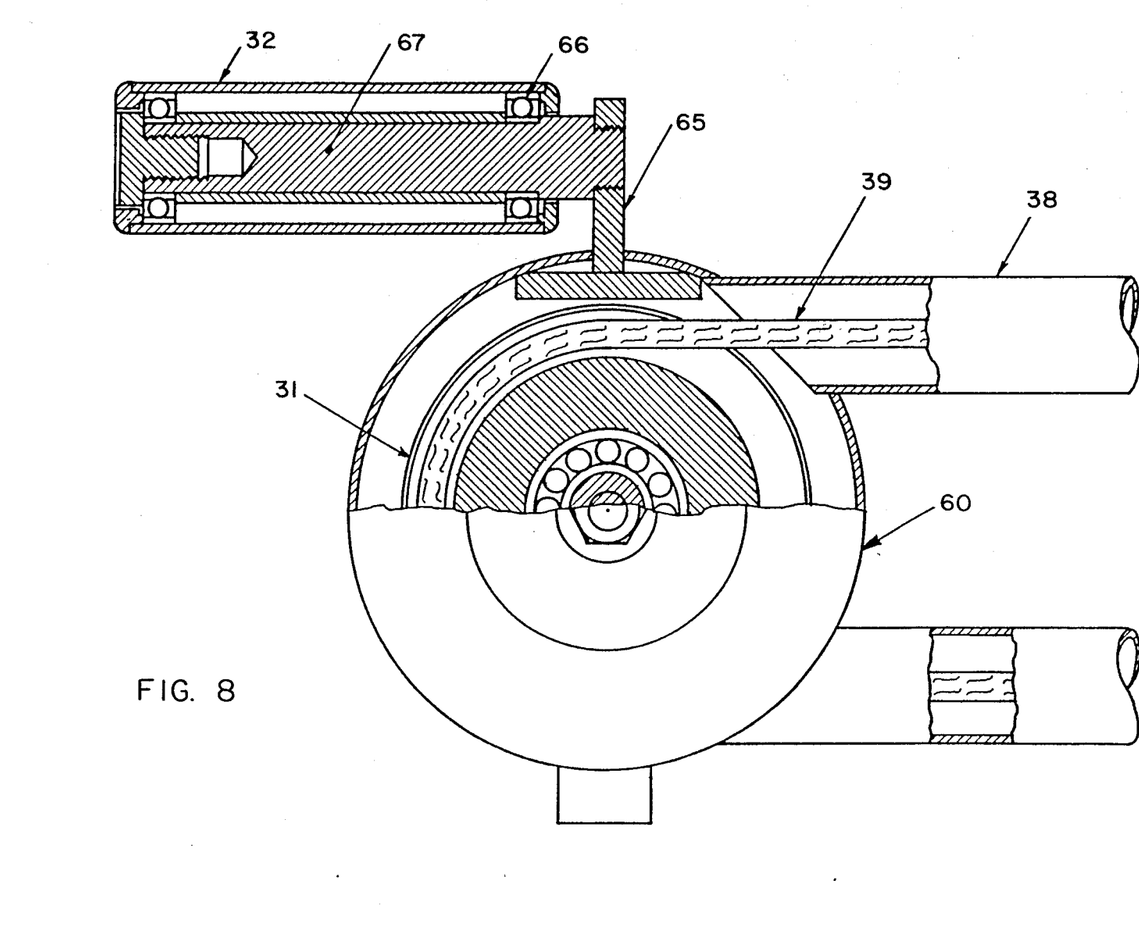
FIG. 8 is a partial side view of the apparatus base showing partial cross sections of the roller, stop roller and structural tubes in which belts transmitting the movement to the front roller from the rear roller are located.

FIG. 8 shows the particular case of leading roller 31. In this partial cross-sectional view, it can be seen that a stop roller 32 is anchored on support 65, which in turn is anchored and soldered on cover 60. The stop roller 32, rolls around ball bearings 66, which in turn are mounted around a central axis 67 having one lag end screwed onto support 65.

Figure 9:
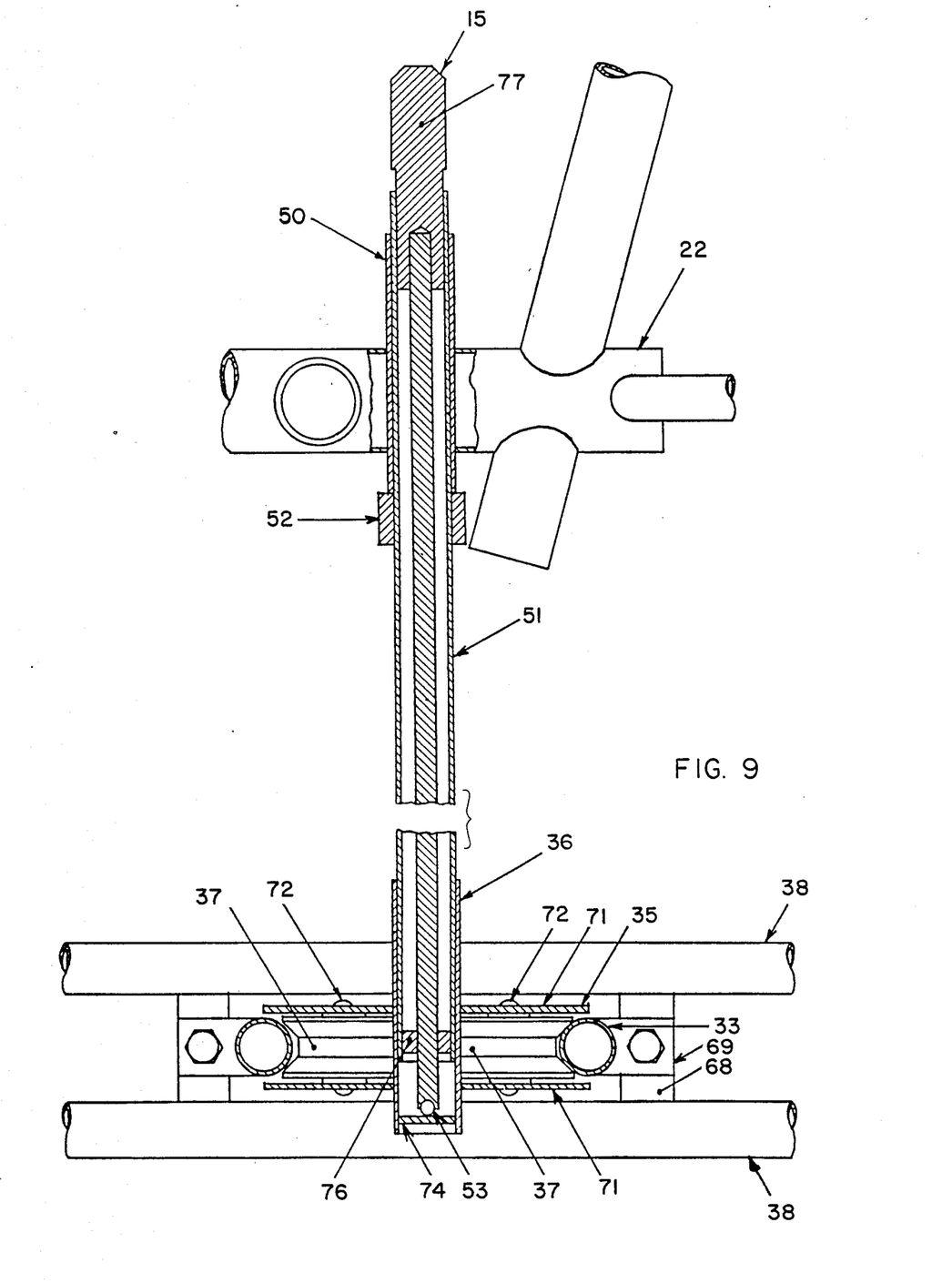
FIG. 9 is a cross sectional view of the sliding support and the effort adjusting rod of FIG. 1.

Referring back to FIG. 1, it is seen that tubular structure 33 located parallel to rollers 31, 31A and slightly backwards from the center of base 30 is affixed to tubes 38 by means of four supports 69, which in turn are fastened by screws to four tubes 68, vertically positioned between tubes 38 and soldered thereto (see FIG. 9).

Tubular structure 33 is basically formed by a round tube bent in an elongated "o"-shaped form. At its ends, and in order to give support to the structure, there are provided two vertically positioned tubes 70 soldered to said tubular structure at each end. Said tubular structure exceeds the limits of base 30, as established by tubes 38, such that the generated area in the tubular structure within the inside area of the base, has a rectangular shape. As is seen from FIG. 2, said area is referred to as A. Inside area A there is a rectangular shaped mechanism 35, which comprises two rectangular metal plates 71, separated one from the other in parallel relationship, and fastened in a fixed manner by means of four rivet-spacers 72 (see FIG. 9.) In between plates 71 of mechanism 35 there are four free rotating wheels 37 similar to pulleys with a V-shaped groove that fit exactly against both sides of tubular structure 33. In this manner, mechanism 35 is free to smoothly move along the tubular structure 33 in a transverse direction with respect to base 30. It is through mechanism 35 that the lateral movement of universal bicycle 20 is achieved.

Said mechanism 35 holds in its center, a vertical through-passing tube 36, soldered to both plates 71. Said tube has in its bottom end, a metal disk 74 which closes the end of tube 36.

Through the open top end of tube 36, rod 15 is introduced, and serves to accept tube 50 of bicycle 20. Rod 15 provides two basic functions in the present invention:
(a) holding bicycle 20, in a ready-to-ride position; and
(b) providing variable adjustment of the relative distance between bicycle 20 and base 30, in order to generate the variable effort characteristics for pedalling exercise.

Function (a) is obvious from an observation of FIG. 1. On the other hand, function b) originates from the design of rod 15. This latter function will be described in detail around the principle of this rod.

Rod 15 consists of a metal tube 51 having in its bottom end (see FIG. 9), and inside the tube, a relatively thick metal disk 76 with a through passing hole in its center that is threaded to simulate a nut. Disk 76 is soldered around its perimeter against tube 51. A steel solid rod 77 is introduced inside tube 51 through the top end of said tube. Rod 77 has at its bottom end, as seen in FIG. 9, a threaded length portion with an equal thread specification as that of disk 76, in order to allow screwing of rod 77 in disk 76. Additionally, at the bottom end, rod 77 holds a ball 53 secured to that end by upsetting means that allow ball 53 to move freely, to provide a frictionless bearing. On the opposite end of rod 77, a solid, cylindrical handle is disposed, said handle having a contour that is rough grinded to provide a sufficiently corrugated surface in order to allow easy turning by hand (i.e. screwing or unscrewing) without sliding. Said handle is disposed over the rod with a tight adjustment so that both parts form a unit, that constitutes rod 77.

At a given convenient height, and in order to secure a safe mounting of tube 50 from frame 22 over rod 15, and to limit its way in, there is provided a metallic collar 52 that is inserted over tube 51 and soldered around its perimeter to said tube.

This design, allows tube 51 to move up or down, depending upon how rod 77 is turned (i.e. by screwing or unscrewing from disk 76). In this way, a rider can adjust the relative distance between bicycle 20 and base 30 by exerting more or less pressure between the wheels of the bicycle and rollers 31, 31A in the base, to permit the exercising of higher or lower strength on the pedals, due to the friction effect between roller and wheel, without having sliding effect between them.

This adjustment, due to the double tube of structure 33, within which mechanism 35 travels, no matter what the pressure on the two wheels of bicycle 20 over rollers 31, 31A, prevents a rocking movement which would allow one of the wheels to come off of its contact with its respective roller. As a consequence the desired lateral movement of the bicycle would stop if the leading wheel loses contact with roller 31, or the movement of the trailing wheel looses contact with roller 31A. In both cases the bicycle loses its desired lateral movement.

The above description of the preferred embodiment is for providing an understanding of the present invention and is therefore not to be taken as a limitation on the invention scope.

What is claimed is:

1. Apparatus that permits bicycle riding indoors with a feeling of being outdoors due to the freedom of the bicycle wheels to move laterally when riding, comprising a universal bicycle having a vertically positioned tube located on a lower portion of said bicycle; a rectangular structural base having free leading and trailing rotating rollers on which leading and trailing wheels of said bicycle lie; said bicycle being supported by a rigid rod fitted within said tube and assembled on a lateral sliding mechanism on said structural base that simulates a sensation of bicycling over a road; said rigid rod having an adjustment system for varying the pedalling resistance; and wherein two lateral stop rollers are mounted at each end of said leading roller to prevent the leading bicycle wheel from going off of said leading roller.

2. The apparatus of claim 1, wherein said bicycle comprises a bicycle saddle adjustment means in which a saddle supporting tube has a square cross section and a sufficient stroke length to allow a tall or small person to ride said bicycle, and a locking device to hold said saddle in a selected place.

3. The apparatus of claim 2, wherein said locking device comprises an outer tube having a V-shaped cut at the middle of said tube, two solid metal cylinders lodged inside said tube to provide said cylinders with a 45°-cut at one of its ends so that, when face to face, the cut-ends form a V-shaped groove which when coupled with said square cross section saddle supporting tube, said cylinders are capable of providing a clamping force on said square cross section tube to hold it securely in place, each of said cylinders is provided with a threaded hole having a different diameter and thread, a stud with a handle terminating end having along its length two threads which differ in diameter and thread, which threads mate with those in said cylinders, said stud being screwable in said cylinders beginning with the one having the major diameter to produce an effect in the cylinders pitch per turn impressed on the handle that is different but in the same direction, so that said cylinders close towards each other with a slow closing velocity, thereby obtaining a great clamping force on said square cross section tube, with a minimum applied force on the handle.

4. The apparatus of claim 1, wherein said bicycle further comprises a handlebar height adjustment system, comprising a fork having at its lower end a means for holding the leading wheel of the bicycle, said means being formed out of two round and parallel tubes having a curved portion and held in place by a triangular support which allows free access to top open ends of said tubes, two tubes constituting the handlebar support having a smaller diameter than that of the fork tubes are introduceable through said top open ends, but curved in the same manner and with the same radius of curvature; said handlebar support tubes being of a length to obtain a handlebar height adjustment which is compatible with said saddle height adjustment of said bicycle.

5. The apparatus of claim 1, wherein said structural base comprises a rectangular shape and two free rotating rollers forming minor opposing sides of said rectangular shape, said rollers being mounted on ball bearings which are mounted on a central axle, wherein two major sides of said rectangular shape are formed each by two round metal tubes located one over the other in parallel and spaced apart relationship from the other, said tubes having respective ends connected to respective four covers located at the end of said rollers, said rollers being connected mechanically by two belts which travel within major opposing sides of said structural base forming tubes.

6. The apparatus of claim 5, wherein said structural base comprises a tubular structure formed from a round tube bent in an elongated O-shape and disposed and held to said structural base parallel to said rollers and slightly backward from the center of said structural base, said tubular structure exceeding the limits of said major sides of said structural base, wherein two vertical tubes are soldered at each end of said tubular structure in order to provide support, and wherein said free lateral sliding mechanism is located within an inside area defined by the tubular structure.

7. The apparatus of claim 6, wherein said mechanism comprises two rectangular metal plates in parallel spaced apart relation from each other and held tight by four riveted spacers and four freely rotating wheels located within said plates, wherein each wheel has a V-shaped groove which mates exactly against both sides of a longer part of said tubular structure to cause movement of said mechanism along said tubular structure, and a tube passing across said mechanism in perpendicular direction with respect to its center; said tube having inside at a lower end a metal disk soldered to said tube closing said lower end of said tube, and a rod fitting through said tube over its top open end.

8. The apparatus according to claim 7, wherein said rod holds the bicycle in place in a standing position over said structural base and provides a relative position adjustment between said bicycle and said structural base to prevent a rocking movement which would eliminate the lateral movement if one of said bicycle wheels comes off of contact with one roller; said rod comprises a metal tube, a thick metal disk located inside said tube at its lower end and soldered to the same; said disk having a threaded through-hole which acts as a nut, and a solid steel rod disposed inside of said metal tube over its top open end; said rod having at its lower end, a threaded rod portion which mates with the thread of said disk and a ball set upon said rod; said rod having at its opposing end a cylindrical shape handle having a rough grinded surface, which is screwed in said disk to provide adjustment; a cylinder shaped collar located over and outside of said tube and soldered around the same disposed at a sufficient height along said tube to provide adequate support to said bicycle.

\* \* \* \* \*